United States Patent
Wang et al.

(10) Patent No.: US 6,201,808 B1
(45) Date of Patent: Mar. 13, 2001

(54) SELF-ROUTING MULTICAST NETWORK ARCHITECTURE

(75) Inventors: Jianchao Wang, Cambridge, MA (US); Yuanyuan Yang, South Burlington, VT (US)

(73) Assignees: Verizon Laboratories Inc., Waltham, MA (US); University of Vermont, Burlington, VT (US)

(*) Notice: Subject to any disclaimer, the term of this patent is extended or adjusted under 35 U.S.C. 154(b) by 0 days.

(21) Appl. No.: 09/049,101

(22) Filed: Mar. 27, 1998

(51) Int. Cl.$^7$ .................................................. H04L 12/56
(52) U.S. Cl. ............................................................ 370/390
(58) Field of Search ..................................... 370/351, 388, 370/389, 390, 422

(56) References Cited

U.S. PATENT DOCUMENTS

| | | | |
|---|---|---|---|
| 5,648,957 | * 7/1997 | Lee et al. ............................. | 370/355 |
| 5,671,222 | * 9/1997 | Chen et al. ........................... | 370/388 |
| 5,856,977 | * 1/1999 | Yang et al. ........................... | 370/411 |
| 5,987,028 | * 11/1999 | Yang et al. ........................... | 370/380 |

OTHER PUBLICATIONS

Y. Yang & G.M. Masson, "Broadcast Ring Sandwich Networks", IEEE Trans. on Computers, vol. 44, No. 10, p. 1169–1180, Oct. 1995.

S. Lee & M. Lu, "BNB Self–Routing Permutation Network", Proc. of INFOCOM '91, p. 574–581, 1991.

D. K. Panda, "Issues in Designing Efficient and Practical Algorithms for Collective Communication on Wormhole–routed Systems", ICPP'95 Workshop on Challenges for Parallel Processing, p. 8–15, 1995.

L.M. Li, "Should Scalable Parallel Computers Support Efficient Hardware Multicast?" ICPP'95, Workshop on Challenges for Parallel Processing, p. 2–7, 1995.

D. Nassimi and S, Sahni, "Parallel Permutation and Sorting Algorithms and a New Generalizes Connection Network," Journal of the Association for Computing Machinery, vol. 29, No. 3, p. 642–667, Jul. 1962.

J. Turner, "Design of a Broadcast Packet Switching Network," IEEE Trans. Communication, vol., COM–36, No. 6, p. 734–743, 1988.

T.T. Lee, "Nonblocking Copy Networks for Multicast Packet Switching," IEEE Journal on Selected Areas in Communication, vol. 6, No. 9, p. 1455–1467, 1988.

C.T. Lea, "A New Broadcast Switching Network," IEEE Trans. Communications. vol. COM=36, No. 10, p. 1128–1137, 1988.

C. Lee and A.Y. Oruc, "Design of Efficient and Easily Routable Generalized Connectors," IEEE Trans. Communications, vol. COM–43, No. 2/3/4 p. 646–650, 1995.

Y. Yang and G.M. Masson, "Nonblocking Broadcast Switching Network," IEEE Trans. Computers, vol. C–40, p. 1005–1015, 1991.

(List continued on next page.)

* cited by examiner

*Primary Examiner*—Hassan Kizou
*Assistant Examiner*—Ahmed Elallam
(74) *Attorney, Agent, or Firm*—Leonard Charles Suchyta

(57) ABSTRACT

A new self-routing multicast network that can realize arbitrary multicast (or one-to-many) communication without any blocking. Based on the binary radix sorting, all functional components of the network are recursively constructed reverse banyan networks using a self-routing procedure that provides for pipeline distribution of switch settings. The design allows a potential to greatly reduce the network cost by reusing part of the network. The new multicast network has $O(n \log^2 n)$ cost (logic gates), $O(\log^2 n)$ gate delay, and $O(\log^2 n)$ set-up time, where the unit of time is a gate delay. Further, with feedback part of the network can be reused and the network cost is reduced to $O(n \log n)$.

23 Claims, 10 Drawing Sheets

OTHER PUBLICATIONS

D.M. Koppelman and A. Y. Oruc, "A self–routing Permutation Network," Journal of Parallel and Distributed Computing, vol. 10, p. 140–151, Oct. 1990.

C.Y. Jan and A. Y. Oruc, "Fast Self–routing Permutation Switching on an Asymptotically Minimum Cost Network." IEEE Trans. Computers, vol. 42, No. 12, p. 1469–1479, Dec. 1993.

W.J. Cheng and W.T. Chen, "A New Self–routing Permutation Network," IEEE Trans, Computers, vol. C–45, NO. 5, p. 630–636, 1996.

K. Hwang, "Advanced Computer Architecture: Parallelism, Scalability, Programmability," Ch.7.1, McGraw–Hill, Inc., 1993.

SELF-ROUTING MULTICAST NETWORK ARCHITECTURE

BACKGROUND OF INVENTION

A. Field of Invention

The present invention relates to the field of communication networks, and more particularly to a self-routing multicast network architecture based on recursive network decompositions of reverse banyan multicast networks.

B. Description of Related Art

Multicast, or one-to-many, communication is one of the most important collective communication operations and is highly demanded in parallel applications as well as in other communication environments. Multicast, for example, is required to make updates in replicated and distributed databases. In addition, multiprocessor systems use multicasting for cache coherency to aid message passing, and multicasting is a critical operation for video/tele-conference calls and video-on-demands services in telecommunication environments. Those skilled in the art will recognize that providing multicast support at the hardware interconnection network level is the most efficient way support such communication operations. Generally, switching networks that realize these types of arbitrary multicast communications without any blocking, or multiple rerouting, are referred to as multicast networks.

Another notable feature in multicast network design is self-routing. Self-routing is a routing scheme that permits switch settings to take place during the routing sequence. This allows designers to create a network with faster switch settings, scalability, and less hardware complexity. Conventionally, however, most self-routing network designs relate to permutation networks, and not multicast networks. W. J. Cheng and W. T. Chen, "A New Self-Routing Permutation Network," *IEEE Trans. Computers*, Vol. C-45, No. 5, pp. 630–636, 1996 [hereinafter Cheng and Chen] for example, discloses a self-routing permutation network constructed of reverse banyan networks, and is herein incorporated by reference. Permutation networks, as described by Cheng and Chen, do not provide a one to many broadcast output, but can only route n distinct input packets to n distinct output ports.

Others have attempted to implement multicast networks using recursive designs, but these previous attempts resulted in high propagation delays and expensive hardware costs. In an article by D. Nassimi and S. Sahni entitled, "Parallel Permutation and Sorting Algorithms and a New Generalized Connection Network," *Journal of the Association for Computing Machinery*, Vol. 29, No. 3, pp. 642–667, July 1982, for example, the authors proposed a n×n multicast network that used $O(k \ n^{1+1/k} \log n)$ 2×2 switches. This network had $O(k \log n)$ depth and $O(k \log n)$ set-up time for any k, where $1 \leq k \leq \log n$. Nassimi and Sahni also disclosed a routing algorithm that relied on a cube or a perfect shuffle connected parallel computer consisting of $O(n^{1+1/k})$ processors, which in turn caused the routing process to have a gate delay of $O(k \log^2 n)$. In another article entitled "Design of Efficient and Easily Routable Generalized Connectors," *IEEE Trans. Communications*, Vol. COM-43, No. 2/3/4, pp. 646–650, 1995, C. Lee and A. Y. Oruc disclosed a multicast network with a special built-in routing circuit, and is herein incorporated by reference. This network used $O(n \log^2 n)$ logic gates, and had $O(\log^2 n)$ gate delay and $O(\log^3 n)$ set-up time (where the unit of time is a gate delay). Each of these proposed networks had high gate delays and more substantial hardware costs than are generally desired by network designers.

Therefore, a need exists for a network architecture capable of handling multicast connections in a self-routing manner without the gate delays and hardware costs of conventional designs. Additionally, a need exists for a multicast network with the modularity and scalability not offered by conventional designs.

SUMMARY OF THE INVENTION

Systems and methods consistent with the present invention meet these goals by providing a new multicast network based on the binary radix sorting concept with all functional components of the network recursively constructed with reverse banyan networks. In addition, a self-routing scheme and mechanism permits automatic switch settings that allow $O(n \log^2 n)$ cost (logic gates), $O(\log^2 n)$ gate delay, and $O(\log^2 n)$ set-up time (where the unit of time is a gate delay), and a feedback version that reduces network costs to $O(n \log n)$.

Specifically, the invention provides a self-routing multicast network that allows multicast broadcasting without blocking. The network comprises a first sub-network receiving multicast inputs having a destination set and configured to divide the destination set into an upper output subset and a lower output subset; and a second sub-network, coupled to the first sub-network, configured to route the upper output subset and lower output subset to an output destination. The second sub-network includes an upper binary radix sorting multicast network (BRSMN) coupled to an upper half of the first sub-network and configured to receive the upper output subset, and a lower BRSMN coupled to a lower half of the first sub-network and configured to receive the lower output subset.

The self-routing multicast network also includes a self-routing mechanism that permits the network to be configured for one pass routing of the multicast packets. The mechanism includes means for determining a number of tag value occurrences; means for determining an initial switch setting of a plurality of switches residing in network, wherein the initial switch setting is derived from the determined number of tag value occurrences; and a switch setting means for setting a switch position of a switch in the plurality of switches, wherein the position is derived from the initial switch setting. The self-routing mechanism is also recursively distributed throughout the sub-networks within the larger network.

The invention also provides for a method for implementing the aforementioned self-routing multicast network.

The summary and the following detailed description should not restrict the scope of the claimed invention. Both provide examples and explanations to enable others to practice the invention.

BRIEF DESCRIPTION OF THE DRAWINGS

The accompanying drawings, which form part of the detailed description, show embodiments of the invention and, together with the description, explain the principles of the invention.

In the drawings.

DETAILED DESCRIPTION

The following description of implementations of this invention refer to the accompanying drawings. Where appropriate, the same reference numbers in different drawings refer to the same or similar elements.

Systems and methods consistent with the present invention utilize a self-routing multicast network fashioned from a recursive design using a reverse banyan network (RBN) configuration and binary radix sorting concepts. Reusing part of the multicast network, as is inherent by the recursive features, reduces hardware cost and gate delays. In addition, the self-routing features employed in the present invention further contribute to the reduction of hardware costs and gate delays.

A. Multicasting Design with Recursively Constructed RBNs

Figure 1:
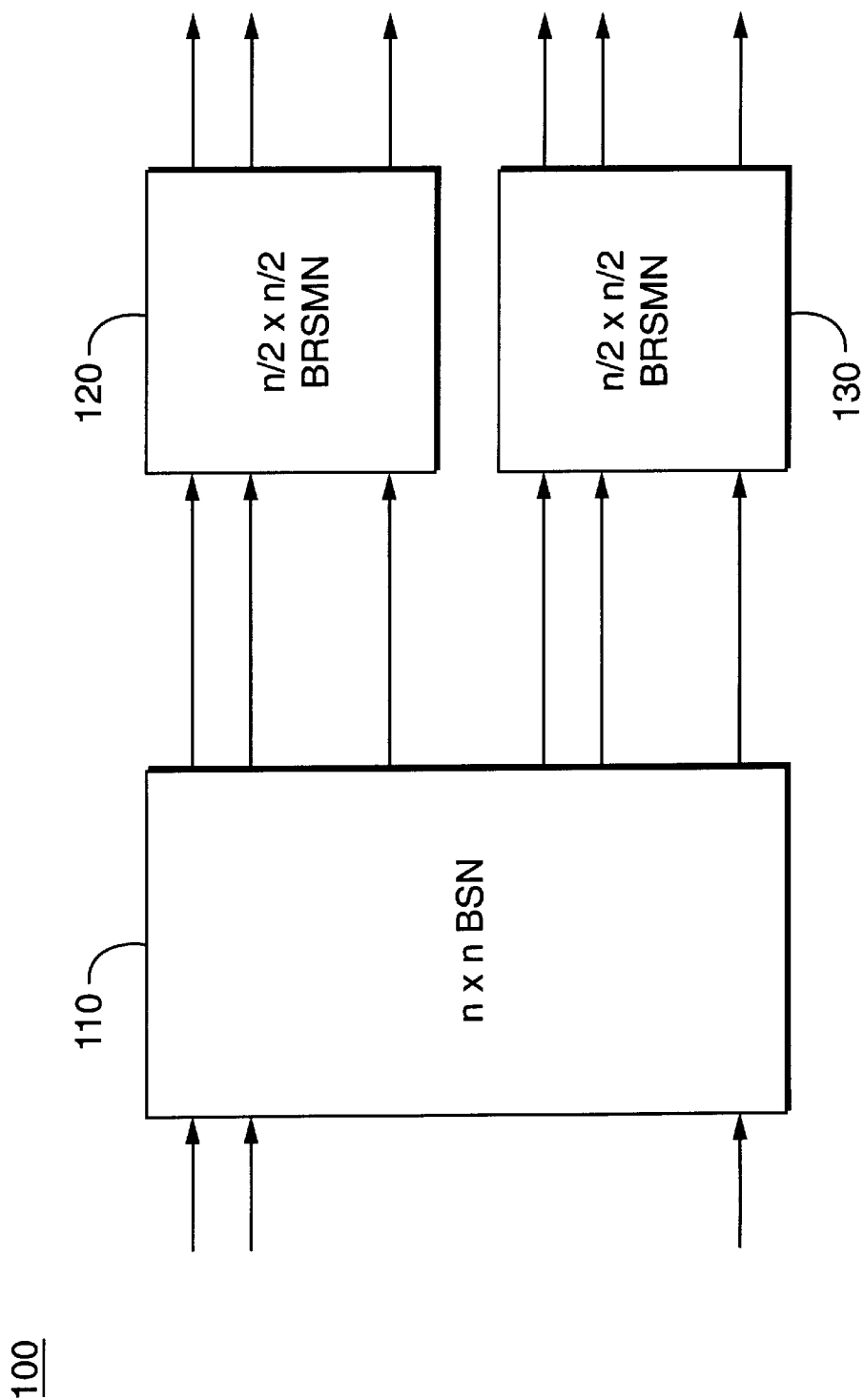
FIG. 1 is a block diagram of a multicast network architecture consistent with the present invention.

FIG. 1 is a block diagram of a multicast network architecture 100 consistent with the present invention. Multicast network 100 is a n×n binary radix sorting multicast network (BRSMN) constructed of a n×n binary splitting network (BSN) 110 and two n/2×n/2 BRSMNs 120 and 130. BRSMN 120 and 130 are linked to the upper half and lower half of BSN 110, respectively. In this configuration, n is the number of inputs and number of outputs for BRSMN 100 and n=$2^m$, where m is the number of bits of the binary address ($a_0\ a_1\ \ldots\ a_{m-1}$) for each input and output of BRSMN. For a multicast connection from network input I (where $0 \leq I \leq n-1$) to a subset of network outputs, let $I_i$ denote the subset of the outputs to which input I is connected. The symbol $I_i$ is referred to as the destination set of the multicast connection or the destination set of input I. A multicast assignment is expressed as a set $\{I_0, I_1, \ldots, I_{n-1}\}$ where, $I_i \cap I_j = \phi$ for $i \neq j$ and $\cup_{i=0}^{n-1} I_i \subseteq \{0,1, \ldots, n-1\}$.

For an input I, if all member elements in its destination set $I_i$ are in the upper half of the network outputs (i.e., the most significant bit (MSB) of each binary address in $I_i$ is 0), there is a single connection from input I via the n×n BSN 110 to an input of the upper BRSMN 120 with the same destination set $I_i$. If all members in $I_i$ are in the lower half of the network outputs (i. e., the MSB of each binary address in $I_i$ is 1), then there is a single connection from input I via the BSN 110 to an input of the lower BRSMN 130 with the same destination set $I_i$. If some members in $I_i$ are routed to the upper half and other elements in $I_i$ are routed to the lower half, there are two connections from input I via BSN 110, with each routed to upper BRSMN 120 and lower BRSMN 130, respectively. The original destination set $I_i$, is split into two subsets, forming the destination sets of the corresponding inputs of the upper and the lower n/2×n/2 BRSMNs 120 and 130, respectively. Then, for an n/2×n/2 BRSMN, the second most significant bit of the binary addresses in the corresponding destination set governs the next routing operation. This routing procedure is continued until the routing destination is reached.

Figure 2:
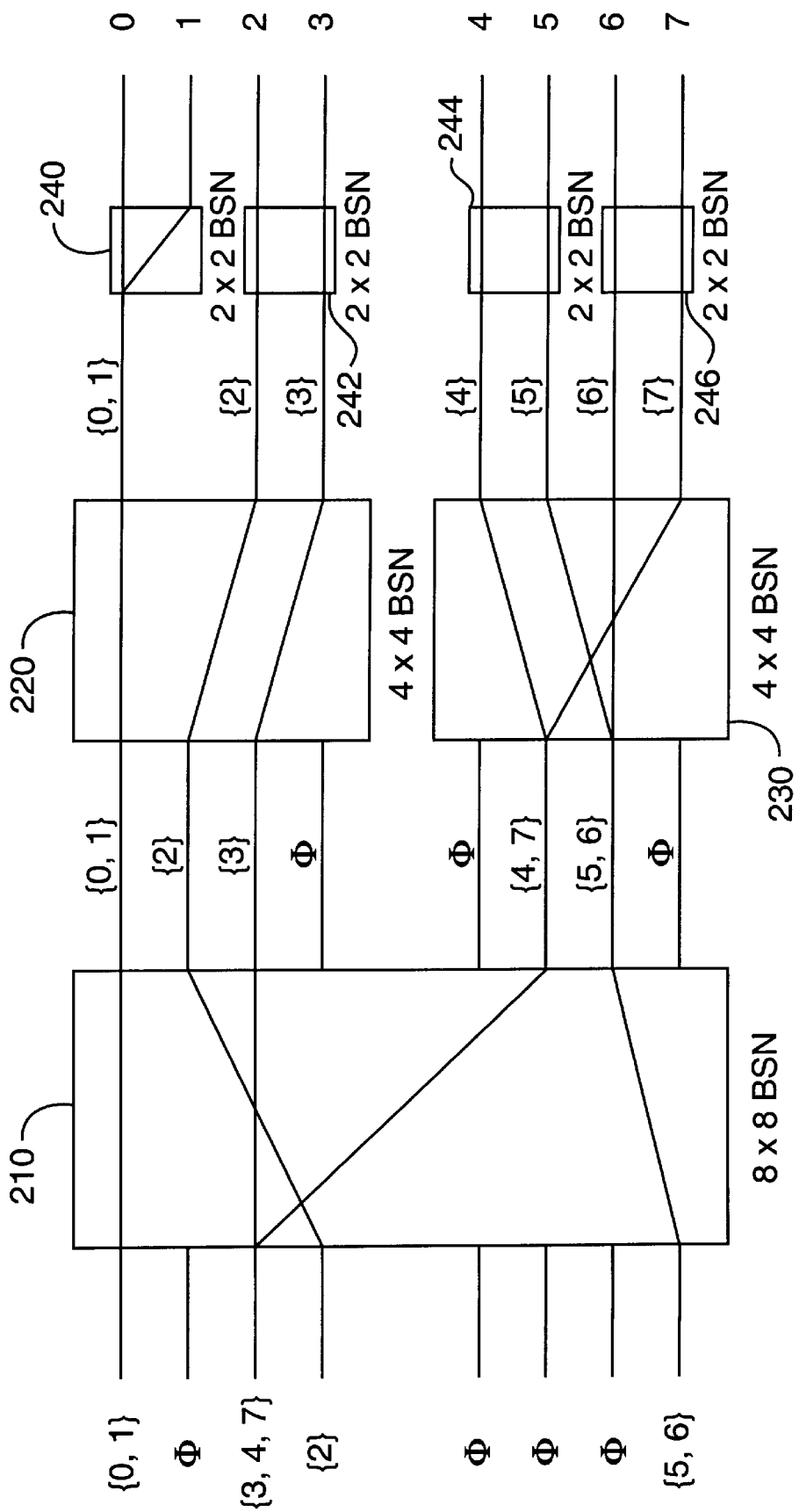
FIG. 2 is a block diagram showing routing in an 8×8 multicast network consistent with FIG. 1.

FIG. 2 shows the routing for the multicast assignment in the above example with an 8×8 BRSMN consistent with that shown in FIG. 1. In this example, BSN 100 is replaced by an 8×8 BSN 210 that is connected to an upper 4×4 BRSMN 220 and a lower 4×4 BRSMN 230. BRSMN 220 and BRSMN 230 are each coupled to a number of 2×2 switches 240 and 242 and 244 and 246, respectively. The following is an a example of a multicast assignment of an 8×8 network, as shown in FIG. 2, $\{\{0,1\}\},\phi,\{3,4,7\},\{2\},\phi,\phi,\phi,\{5,6\}\}$.

The multicast assignment represented in a binary format is:

$$\left\{\begin{pmatrix}0 & 0 & 0 \\ 0 & 0 & 1\end{pmatrix}, \phi, \begin{pmatrix}0 & 1 & 1 \\ 1 & 0 & 0 \\ 1 & 1 & 1\end{pmatrix}, \{0\ 1\ 0\}, \phi, \phi, \phi, \begin{pmatrix}1 & 0 & 1 \\ 1 & 1 & 0\end{pmatrix}\right\}.$$

This destination set is used to determine the output destination for each member of the set. Each member is assigned a tag value that is the binary equivalent of the member. BSN 210 routes all lower destination set members (i.e., those with a low input tag values 0–3) to upper BRSMN 220 and routes all higher destination set members (i.e., those with a low input tag values of 4–7) to lower BRSMN 230. As stated above, upper and lower routing is accomplished by determining whether the MSB of the member tag value is 0 or 1. Destination members with a $\subset$ tag value (i.e., a wild card for unassigned inputs) are assigned to those inputs of BRSMN 220 and BRSMN 230 receiving the don't care members.

After receiving the upper and lower destination sets, switch settings in BRSMN 220 and BRSMN 230 allow the two sub-networks to route the upper and lower destination sets to the collection of 2×2 switches 240, 242, 244, and 246, by determining whether the second MSB of the member tag is 0 or 1.

Figure 3:
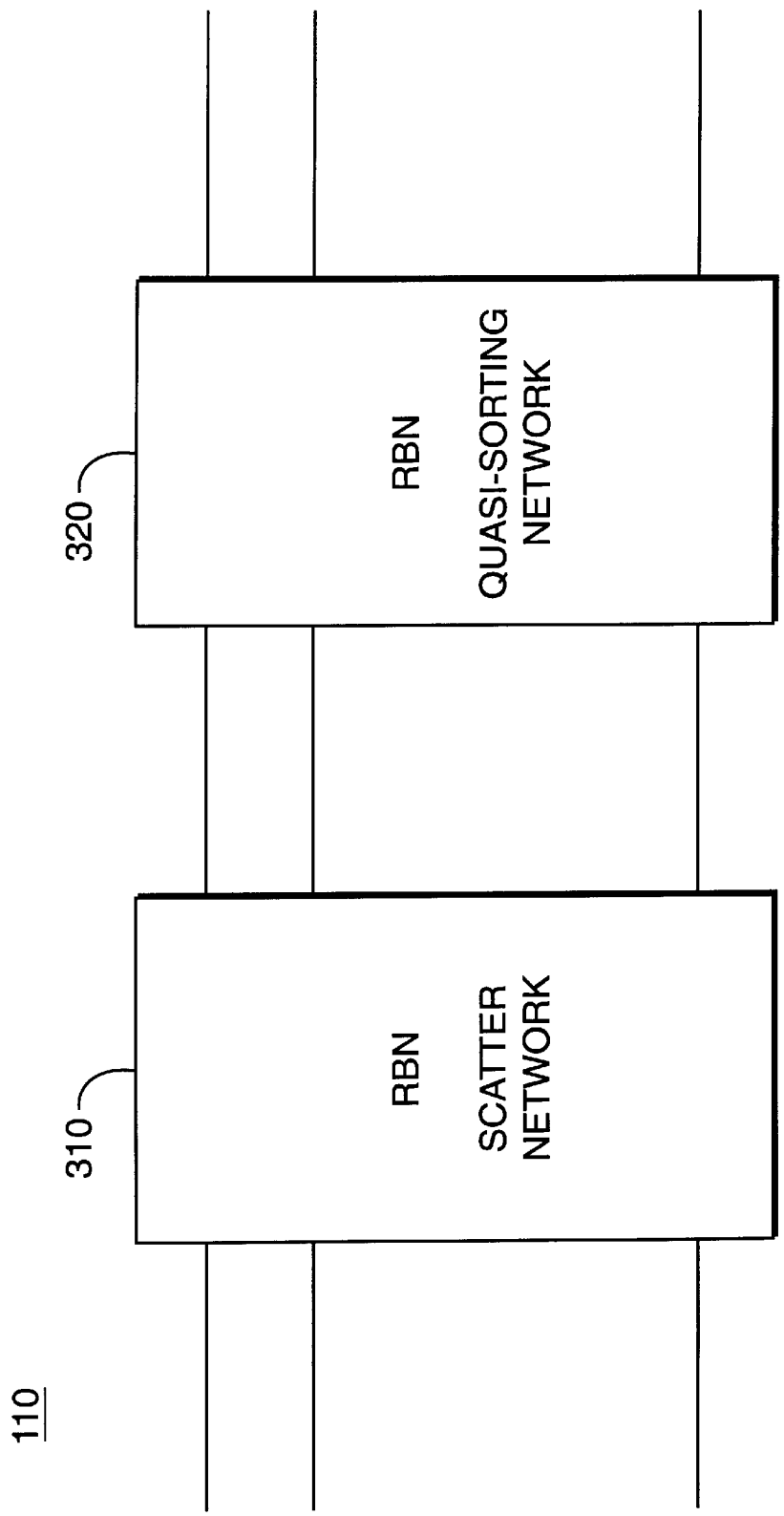
FIG. 3 is a block diagram of a binary splitting network consistent with FIG. 1.

FIG. 3 is a block diagram of BSN 110 consistent with network of FIG. 1. The recursive design of network 100 also allows BSN 110 to be a sub-component of both BRSMR 220 and BRSMN 230. BSN 110 is constructed by cascading two n×n reverse banyan networks (RBN) 310 and 320. The function of BSN 110 is to split (when necessary) the multicast connection on each input based on whether the member belongs to an upper or lower portion of the destination set. If the input of the multicast connection belongs to both an upper destination subset and a lower destination subset, its members are split and properly routed to either upper or lower n/2×n/2 BRSMNs 120 and 130. Given that an output belonging to the upper destination subset or the lower half of the network outputs is determined by the MSB of its binary address, routing in BSN 110 is accomplished by using a routing tag with four values for each link: 0, 1, α, and ε.

Figure 4:
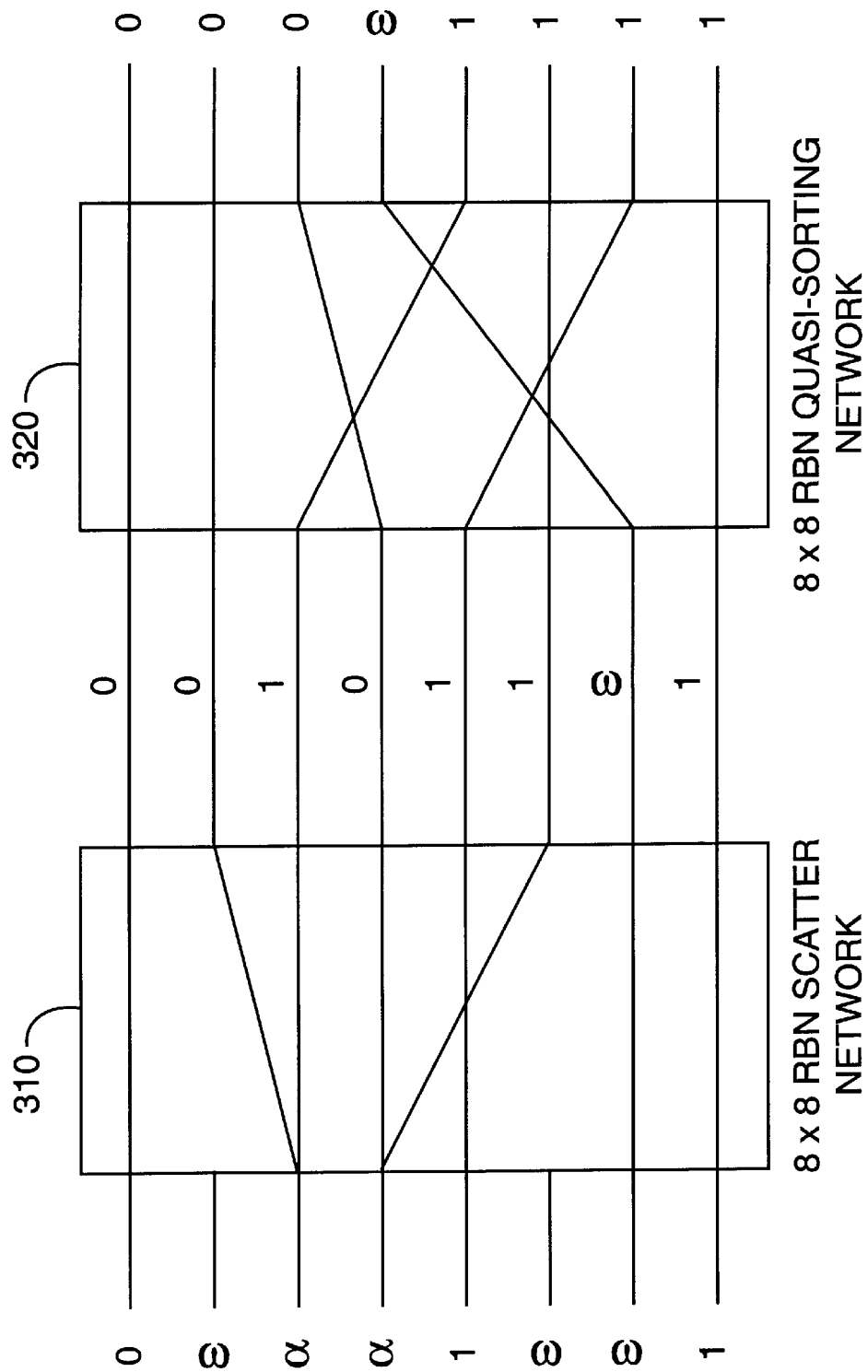
FIG. 4 is a block diagram showing multicast routing consistent with the binary splitting network of FIG. 3.

According to one approach, 0 indicates that all destinations of the multicast connection borne on the link have a 0 MSB, and 1 indicates that all destinations of the multicast connection borne on the link have a 1 MSB. Further, α indicates that at least one destination of the multicast connection borne on the link has a 0 MSB and at least one destination of the multicast connection has a 1 MSB, and ε indicates the link is idle (i.e., carries no multicast packets). FIG. 4 is a block diagram showing routing in RBN 310 and RBN 320 consistent with FIG. 3.

In an n×n BSN using the four value routing tags, if $n_0$, $n_1$, $n_\alpha$, and $n_\epsilon$ denote the number of inputs with value 0, 1, $\alpha$, $\epsilon$, respectively, then the number inputs and outputs is represented as $$n_0 + n_1 + n_\alpha + n_\epsilon = n \quad (1)$$

Since at most half of the outputs are in the upper half of the network outputs, equation (2) must be true.

$$n_0 + n_\alpha \leq n/2. \quad (2)$$

Similarly, $$n_1 + n_\alpha \leq n/2 \quad (3)$$

and, it can also be noted that $$n_\alpha \leq n_\epsilon \quad (4)$$

which is derived from (1), (2), and (3).

To accomplish its function, BSN 110 transforms the input tags 0's, 1's, $\alpha$'s, and $\epsilon$'s to the output side such that all $\alpha$'s are eliminated. The output is such that all 0's are in the upper destination subset, all 1's are in the lower destination subset, and numbers of the different tags satisfy the equations in (5) below. Letting $\hat{n}_0$, $\hat{n}_1$, $\hat{n}_\epsilon$, and $\hat{n}_\alpha$ denote the numbers of outputs from BSN 110 with tag values 0, 1, $\epsilon$, and $\alpha$, respectively, and since any $\alpha$ paired with one $\epsilon$ is transformed to a pair of 0 and 1, then $$\hat{n}_0 = n_0 + n_\alpha, \ \hat{n}_1 = n_1 + n_\alpha, \ \hat{n}_\epsilon = n_\epsilon - n_\alpha, \text{ and } \hat{n}_\alpha = 0. \quad (5)$$

RBN 310, also referred to as a scatter network, is a switch configuration that scatters all inputs with an input tag of a to 0's and 1's. In other words, the transformation from the inputs to the outputs of the RBN 310 is $\{0, 1, \alpha, \epsilon\} \Rightarrow \{0, 1, \epsilon\}$. RBN 320, also referred to as a quasi-sorting network, routes all 0's to the upper destination subset and all 1's to the lower destination subset. Each $\epsilon$ input tag is routed to either the upper or the lower RBNs.

B. RBN as a Bit Sorting Network

This section explains using an RBN as a bit sorting network in greater detail. If only two values, $\beta$ and $\gamma$, are passed in a RBN, an n-bit circular compact sequence of $\beta$'s and $\gamma$'s can be defined as follows:

$$C_{s,l;\beta,\gamma}^n = \begin{cases} \beta^{[s]} \gamma^{[l]} \beta^{[n-s-l]} & \text{if } s+l \leq n \\ \gamma^{[l-n+s]} \beta^{[n-l]} \gamma^{[n-s]} & \text{if } s+l > n \end{cases} \quad (6)$$

where $0 \leq s < n$ and $0 \leq l \leq n$. The circular compact sequence is a routing scheme that defines the switch settings for routing the input values to the particular outputs. The actual meaning of the circular compact sequence $C_{s,l;\beta,\gamma}^n$ is that, in an n-bit sequence all l y-bits are compacted together followed by (also compacted) (n-l) $\beta$-bits in a circular way (modulo n). In the compact sequence, s is the starting switch position for the $\gamma$-bit sequence, and l is the number of inputs having a particular tag value. If, for example, there are 3 inputs having a one (1) tag and 2 having a zero (0) tag, then $l = l_0 + l_1 = 5$.

Cheng and Chen considered the circular compact sequence of 0's and 1's in their permutation network, and generally found: For any $\beta$-$\gamma$ values on the inputs of an RBN, a circular compact sequence with any starting position can be achieved at the outputs of the RBN under a proper setting for switches in the network.

The inputs of the n×n RBN consist of l $\gamma$'s and (n-l) $\beta$'s, among which the upper half n/2 inputs contain $l_0$ $\gamma$'s and the lower half n/2 inputs contain $l_1$ $\gamma$'s, where $l_0 + l_1 = l$. Given integers n, s, l, $l_0$, and $l_1$, and if n is an even number, $0 \leq s \leq n$, $0 \leq l \leq n$, $0 \leq l_0, l_1 \leq n/2$ and $l = l_0 + l_1$, there are integers $s_0$ and $s_1$, $0 \leq s_0, s_1 \leq n/2$, such that $C_{s_0,l_0;\beta,\gamma}^{n/2}$ and $C_{s_1,l_1;\beta,\gamma}^{n/2}$ are merged to $C_{s,l;\beta,\gamma}^n$. According to the prefect shuffle pattern, inputs are either subject to a switch setting $r_i$ with a crossing output switch setting $r_i=1$, or a parallel output switch setting $r_i=0$.

Therefore, letting $$s_0 = s \bmod n/2, \ s_1 = (s+l_0) \bmod n/2$$

and the switch setting of an n×n merging network be $$r_i = \begin{cases} b & 0 \leq i < s_1 \\ \overline{b} & s_1 \leq i \leq n/2 \end{cases}$$

where $$b = \left[(s+l_0) \text{div} \frac{n}{2}\right] \bmod 2 \text{ and } \overline{b} = (1-b) \bmod 2,$$

and $C_{s_0,l_0;\beta,\gamma}^{n/2}$ and $C_{s_1,l_1;\beta,\gamma}^{n/2}$ are merged to $C_{s,l;\beta,\gamma}^n$ through the n×n merging network under the above switch setting. By using the notations of the circular compact sequence, this merging operation in the n×n merging network can be expressed as $$C_{s_0,l_0;\beta,\gamma}^{n/2} C_{s_1,l_1;\beta,\gamma}^{n/2} \xrightarrow{W_{0,s_1;b,\overline{b}}^{n/2}} C_{s,l;\beta,\gamma}.$$

As stated above, a circular compact sequence is a $\beta$-$\gamma$ sequence such that all the $\beta$'s (and all the $\gamma$'s) are consecutively arranged in a circular way. Both $C_{s_0,l_0;\beta,\gamma}^{n/2}$ and $C_{s_1,l_1;\beta,\gamma}^{n/2}$ are expressed as vertical segments with length n/2, and $C_{s,l;\beta,\gamma}^n$ is expressed as a vertical segment with length n. The first $s_1$ consecutive switches all are set to setting b, and the rest of the n/2-$s_1$ consecutive switches are set to the opposite setting $\overline{b}$. The segment for $C_{s_0,l_0;\beta,\gamma}^{n/2}$ is divided into two sub-segments $x_0$ (of length $s_1$) and $y_0$ (of length n/2-$s_1$). Similarly, the segment for $C_{s_1,l_1;\beta,\gamma}^{n/2}$ is divided into two sub-segments $x_1$ (of length $s_1$) and y, (with length n/2-$s_1$). It should be note that since a segment $x_1$ o $y_1$ (where o means concatenation) represents $C_{s_1,l_1;\beta,\gamma}^{n/2}$ and $x_1$ has a length $s_1$, which equals the starting position of the $\gamma$'s sequence in $C_{s_1,l_1;\beta,\gamma}^{n/2}$. The sequence $x_1$ ends with $\beta$ and sequence $y_1$ starts with $\gamma$. Also, since $s_1 = (s+l_0) \bmod n/2 = (s_0+l_0) \bmod n/2$ and $x_0$ is of length $s_1$, in segment $x_0$ o $y_0$, the sequence $x_0$ ends with $\gamma$ and sequence $y_0$ starts with $\beta$. Therefore, under the above switch setting, $C_{s_0,l_0;\beta,\gamma}^{n/2}$ and $C_{s_1,l_1;\beta,\gamma}^{n/2}$ are merged to the sequence $x_0$ o $y_1$ o $x_1$ o $y_0$ (for b=0), or $x_1$ o $y_0$ o $x_0$ o $y_1$ (for b=1), which is the circular compact sequence $C_{s,l;\beta,\gamma}^n$.

It should be noted that for a full permutation assignment, only two tag values 0 and 1 are used, and therefore previous solutions do not hold true for full multicast routing schemes, where multiple output destinations are necessary. Letting $\beta$ be 0, $\gamma$ be 1, and the initial starting position for an n×n RBN be s=n/2, the total number of 1's is l=n/2. Therefore, the circular compact sequence $C_{s,l;0,1}^n = 0^{[n/2]} 1^{[n/2]}$, representing bit sorting in an ascending order is achieved.

C. RBN as a Scattering Network

Figure 5:
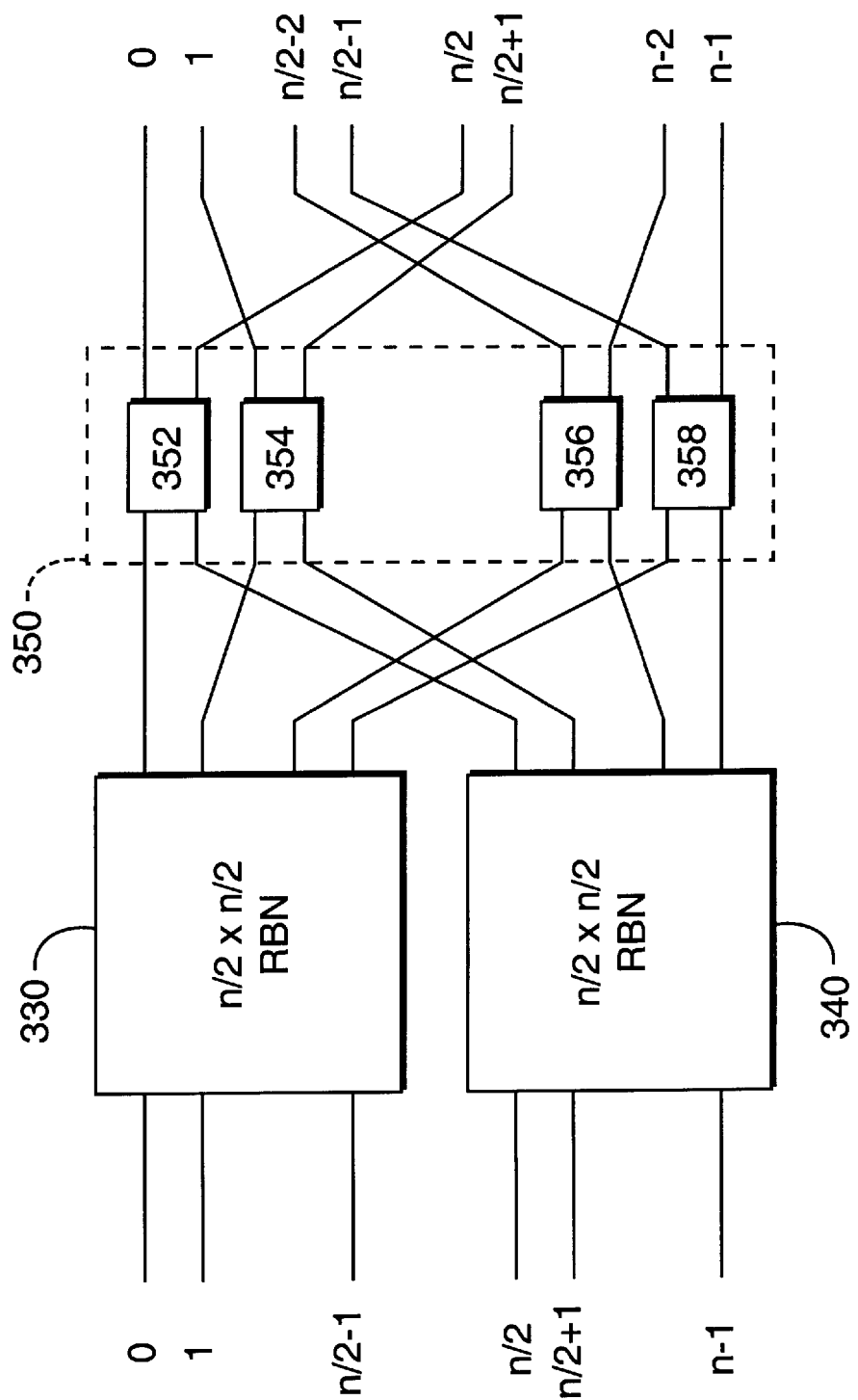
FIG. 5 is a block diagram of a recursive n×n reverse banyan network consistent with FIG. 3.

This section describes how an RBN is used as a scattering network for partial permutation or multicast assignments. As shown in FIG. 4, the inputs to scatter network 310 have tag values 0, 1, $\alpha$, and $\epsilon$. These tag values, as described above, allow scatter network 310 to determine the switch settings needed to eliminate all inputs with a $\alpha$ input tag, and split theses tag valued inputs between the 0 and 1. Each RBN 310 and 320, are further defined, as depicted in FIG. 5, by two $n/2 \times n/2$ RBNs 330 and 349 coupled to a merging network 350. Merging network, as described in more detail below, uses switch settings of 2×2 switches 352, 354, 356 and 358, to output the remaining tag valued inputs (i.e., 0, 1, and $\epsilon$) in a perfect shuffle format.

In an n×n RBN, which is the scatter network of an n×n BSN, with 0, 1, $\alpha$ and $\epsilon$ values as the inputs, and if $n_0$, $n_1$, $n_\alpha$, and $n_\epsilon$ are the numbers of inputs with value 0, 1, $\alpha$, and $\epsilon$, respectively, then under a proper setting for switches in the network, $\alpha$'s can be eliminated at the outputs of the RBN, (i.e., the outputs of the RBN have only values 0, 1, and $\epsilon$) with $$\hat{n}_0 = n_0 + n_\alpha,\ \hat{n}_1 = n_1 + n_\alpha,\ \hat{n}_\epsilon = n_\epsilon, -n_\alpha,\ \text{and}\ \hat{n}_\alpha = 0,$$

where $\hat{n}_0$, $\hat{n}_1$, $\hat{n}_\epsilon$, and $\hat{n}_\alpha$ are the numbers of outputs with value 0, 1, $\epsilon$, and $\alpha$, respectively, provided that $0 \leq \hat{n}_0$, $\hat{n}_1 \leq n/2$ and $\hat{n}_0 + \hat{n}_1 + \hat{n}_\epsilon = n$.

In the recursively defined sub-network (i.e., the n'×n' RBN of the n×n RBN), $n'_\alpha \geq n'_\epsilon$, where $n'_\alpha$ and $n'_\epsilon$ are the numbers of inputs (of this n'×n' RBN) having a tag value of $\alpha$ and $\epsilon$, respectively. In order to distribute these values uniformly, inputs having tag values 0 and 1 are combined into a single value $\chi$. Any link has a value $\chi$ if it has a single value 0 or 1. For example, if the two inputs of a 2×2 switch have values $\alpha$ and $\epsilon$ respectively, $\alpha$ can be scattered so that the two outputs of the switch have values $\chi$'s. In addition, by using the properties of the circular compact sequence previously described, any values on the inputs of an n×n RBN, if $n_\alpha$, and $n_\epsilon$ are the numbers of inputs with value $\alpha$ and $\epsilon$, respectively, $n_\alpha + n_\epsilon \leq n$, and the rest of the inputs of the RBN have values $\chi$. Further, if s is any integer such that $0 \leq s < n$, then (1) if $n_\alpha \leq n_\epsilon$, a circular compact sequence $C_{s,\ n_\epsilon - n_\alpha;\ \chi,\epsilon}^n$ with any starting position s is achieved at the outputs of the RBN under a proper setting for switches in the network; and (2) if $n_\alpha \geq n_\epsilon$, a circular compact sequence $C_{s,\ n_\alpha - n_\epsilon;\ \chi,\alpha}^n$ with any starting position s is achieved at the outputs of the RBN under a proper setting for switches in the network.

To merge two circular compact sequences with the same set of binary values (i.e., merging two sequences with $\chi$'s and $\alpha$'s, $C_{s_0,l_0;\ \chi,\alpha}^{n/2}$ and $C_{s_1,l_1;\ \chi,\alpha}^{n/2}$) the compact sequence described above is used. However, in other cases, where merging of two circular compact sequences with different sets of binary values (i.e., merging a sequence with $\chi$'s and $\alpha$'s, $C_{s_0,l_0;\ \chi,\alpha}^{n/2}$ and a sequence with $\chi$'s and $\epsilon$'s, $C_{s_1,l_1;\ \chi,\epsilon}^{n/2}$) two additional switch settings, an upper broadcast and a lower broadcast, are required. In this embodiment, for any 2×2 switch I, in addition to switch settings $r_i=0$ or 1, the switch setting $r_i=2$ if the switch is set to upper broadcast, and $r_i=3$ if the switch is set to lower broadcast, are needed.

To allow merging of two compact sequences having different sets of binary values, the circular compact sequence with binary values is extended to trinary values in the context of the switch settings. A trinary circular compact sequence of switch setting $W_{s,l_1,l_2;\ \beta_1,\beta_2,\beta_3}^{n/2}$ means $l_1$ consecutive $\beta_2$'s, followed by $l_2$ consecutive $\beta_3$'s, and then followed by $(n/2 - l_1 - l_2)$ $\beta_1$'s in a circular way, with s being the starting position of the $\beta_2$'s sequence.

Given integers n, s, l, $l_0$, and $l_1$, where n is an even number, $0 \leq s < n$, $0 \leq l \leq n$, $0 \leq l_1 \leq l_0 \leq n/2$, and $l = l_0 - l_1$, then $s_0 = s \mod n/2$, $s_1 = (s+l) \mod n/2$. With this trinary compact sequence following four switch settings emerge to satisfy each switch setting possibly.

$$W_{s_1,l_1;\ 0,2}^{n/2},\ \text{if}\ s+l<n/2; \tag{1}$$

$$W_{s_1,l_1;\ n/2-s_1-l_1;\ 1,2,0}^{n/2},\ \text{if}\ s<n/2\ \text{and}\ s+l \geq n/2; \tag{2}$$

$$W_{s_1,l_1;\ 1,2}^{n/2},\ \text{if}\ s \geq n/2\ \text{and}\ s+l<n; \tag{3}$$

$$W_{s_1,l_1,s_1+l_1\ -n/2;\ 0,2,1}^{n/2},\ \text{if}\ s \geq n/2\ \text{and}\ s+l \geq n. \tag{4}$$

With these settings, $C_{s_0,l_0;\ \chi,\alpha}^{n/2}$ and $C_{s_1,l_1;\ \chi,\epsilon}^{n/2}$ are merged to $C_{s,l;\ \chi,\alpha}^{n}$ through n×n merging network 350, as shown in FIG. 5.

FIGS. 6A–6D show routing scenarios for each of the possible switch settings in scattering network 310. For example, the two sub-segments $y_0$ and $y_1$ are on the left in FIG. 6A. In the lower half of the inputs (i.e., $C_{s_1,l_1;\ \chi,\epsilon}^{n/2}$), the sub-segment $y_1$ which starts from position $s_1$ and has a length $l_1$ (in a circular way) consists of consecutive $\epsilon$'s. Also, since $$s_1 = (s+l) \mod n/2 = (s_0+l) \mod n/2 = (s_0+l_0-l_1) \mod n/2,$$

in the upper half of the inputs (i.e., $C_{s_0,l_0;\ \chi,\alpha}^{n/2}$), the sub-segment $y_0$ that starts from position $s_1$ and has a length $l_1$ consists of consecutive $\alpha$'s. Thus, the two sub-segments from the upper and lower halves of the inputs are at the same position within their segment and are separated by a distance of n/2. In addition, in switch settings (1)–(4), only those $l_1$ consecutive switches (in a circular way) starting from the $s^{th}_1$ switch have an upper broadcast setting. That is, all corresponding $\alpha$'s and $\epsilon$'s in these two sub-segments are neutralized (or eliminated), and become $\chi$'s in the corresponding positions on the outputs of the RBN.

In the first routing scenario, since $s+l<n/2$, all the l $\alpha$'s on the outputs are in the upper half. Note that in switch setting $W_{s_1,l_1;\ 0,2}^{n/2}$, all the switches except those with an upper broadcast setting have a parallel setting. Further, since $s_0=s$ and $s_1=s+l=s_0+l_0-l_1$, the sub-segment of length l (in a circular way, modulo n/2) and starting at position $s_0$ and ending at $s_1-1$ in the upper half of the inputs, is mapped to the outputs in a parallel way. Thus, the l consecutive outputs, starting from $s_0=s$ have $\alpha$'s, and the rest of the outputs have $\chi$'s (i.e., $C_{s,\ l;\ \chi,\alpha}^n$).

Figure 6B:
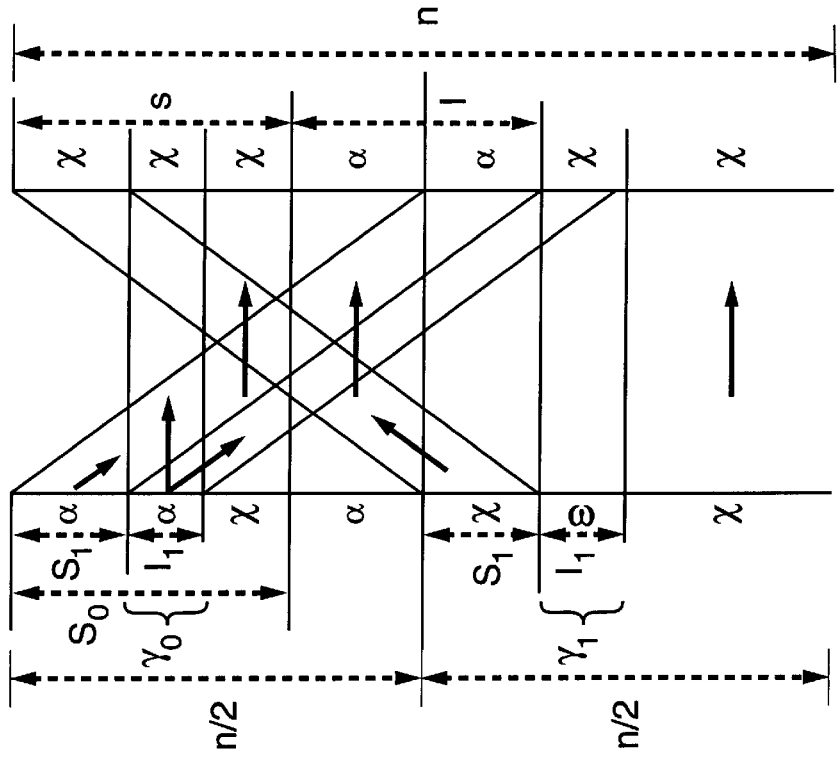
FIGS. 6A, 6B, 6C, and 6D are representative diagrams showing routing scenarios of multicast inputs for a scattering network consistent with the multicast network of FIG. 1.
Figure 6A:
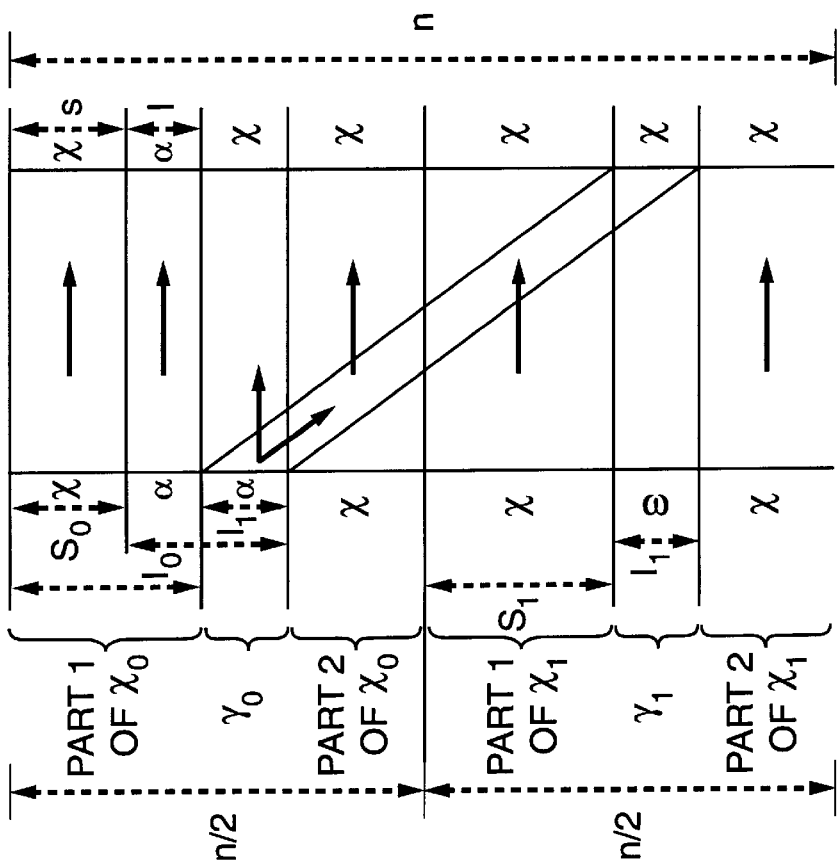

FIG. 6B represents a second routing scenario, where $s<n/2$ and $s+l \geq n/2$. The segment of the consecutive outputs having $\alpha$ tag values are routed across the middle point of the entire segment of all n outputs. In this scenario, all $\alpha$ tag values on the left are in the upper half of the inputs. Therefore, to route these tag value inputs to the required output destination, some inputs having $\alpha$ tag values must be mapped to the outputs in a parallel way, and some must be mapped in a crossing way. Since $s_0=s$ and $s_1=s+l-n/2$, the sub-segment of the inputs with $\alpha$ tag values starting at $s_0=s$ and ending at $n/2-1$ is mapped to the outputs in a parallel way, and the sub-segment of the inputs with $\alpha$ tag values starting at 0 and ending at $s_1-1$ is mapped to the outputs in a crossing way (i.e., mapped to a sub-segment of the outputs starting at n/2 and ending at $n/2-s_1-1$). From this mapping, $(l=s_1+n/2-s)$ consecutive outputs have $\alpha$'s starting at $s=s_0$, and the rest of the outputs have $\chi$'s (i.e., $C_{s,\ l;\ \chi,\alpha}^n$).

Figure 6D:
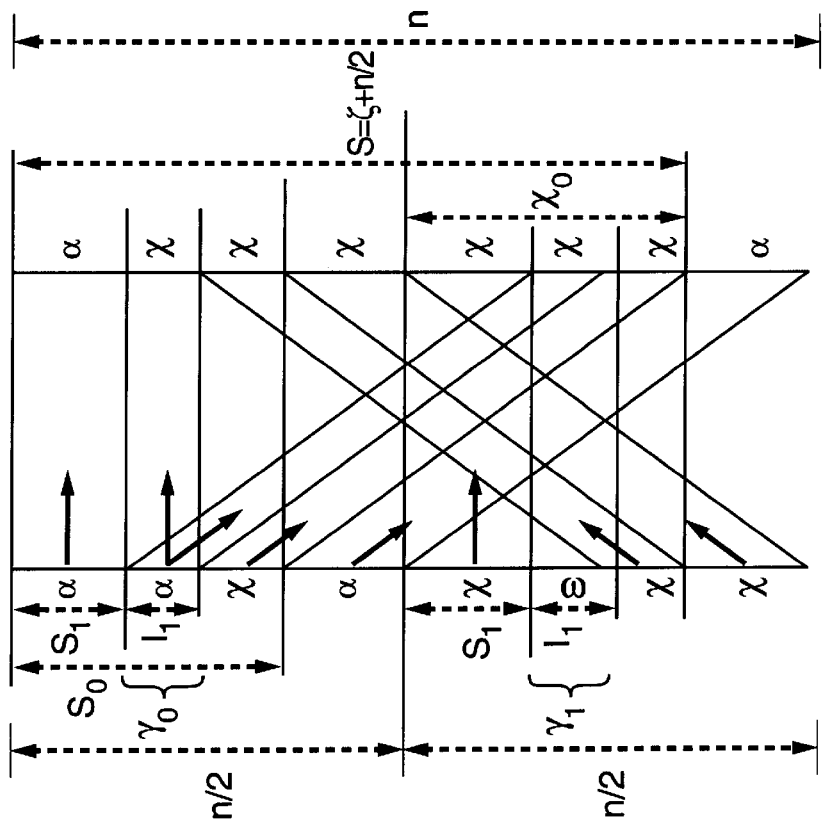
Figure 6C:
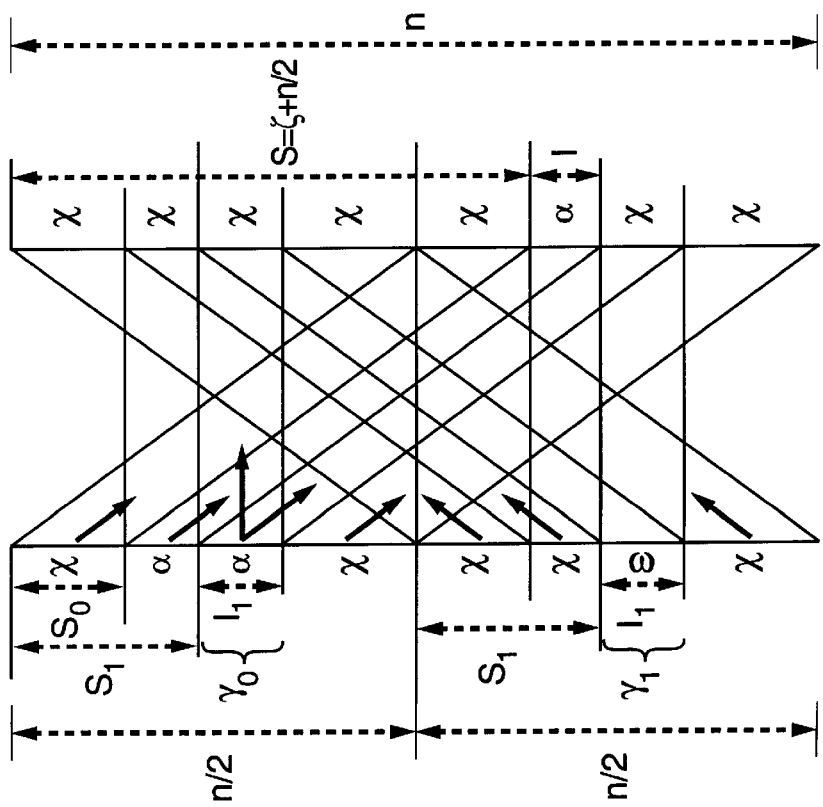

FIG. 6C represents a third routing scenario, where $s \geq n/2$ and $s+l<n$. In this case, all l $\alpha$'s on the outputs are in the lower half. This setting scenario is similar to scenario (1), since $s=s_0+n/2$ and $s_1=s_0+1$, the sub-segment of length l and starting at $s_0$ and ending at $s_1-1$ in the upper half of the inputs is mapped to the outputs in a crossing way. Thus, the 1 consecutive outputs staring from $s=s_0+n/2$ have the inputs $\alpha$ tags, and the rest of the outputs have $\chi$'s (i.e., $C_{s,l;\ \chi,\alpha}^{\ n}$).

FIG. 6D represents a fourth routing scenario, where $s \geq n/2$ and $s+l \geq n$. Similar to scenario (2), some $\alpha$'s on the inputs should be mapped to the outputs in a parallel way, and some $\alpha$'s on the inputs should be mapped to the outputs in a crossing way. Because $s_0=s-n/2$ and $s_1=s+l-n$, under the switch setting $W_{s_1,l_1 s_1+l-n/2;\ 0,2,1}^{\ n/2}$, the sub-segment on the inputs with $\alpha$ input tags starting at $s_0=s-n/2$ and ending at $n/2-1$ is mapped to the outputs in a crossing way; and the sub-segment on the inputs with $\alpha$'s starting at 0 and ending $s_1-1$ is mapped to the outputs in a parallel way. In other words, $l=(n/2-s_0)+s_1=n-s+s_1$ consecutive outputs have $\alpha$'s starting at $s=s_0+n/2$ (in a circular way, modulo n), and the rest of outputs have $\chi$'s (i.e., $C_{s,l;\ \chi,\alpha}^{\ n}$).

Finally, in one embodiment, three other symmetric variants can be obtained by changing the conditions noted above to $l_1 \geq l_0$ and $l=l_1-l_0$, or swapping $\alpha$ for $\epsilon$. The corresponding solutions for theses variations are as follows:

First, given integers n, s, l, $l_0$, and $l_1$, where n is an even number, $0 \leq s < n$, $0 \leq l \leq n$, $0 \leq l_0 \leq l_1 \leq n/2$, and $l=l_0-l_1$, then $s_0=(s+l)$ mod $n/2$, $s_1=s$ mod $n/2$, with the resulting switch settings being $$W_{s_0,l_0;\ 1,2}^{\ n/2}, \text{ if } s+l<n/2;\quad (1)$$

$$W_{s_0,l_0,\ n/2-s_0-l_0;\ 0,2,1}^{\ n/2}, \text{ if } s<n/2 \text{ and } s+l \geq n/2;\quad (2)$$

$$W_{s_0,l_0;\ 0,2}^{\ n/2}, \text{ if } s \geq n/2 \text{ and } s+l<n;\quad (3)$$

$$W_{s_0,l_0;\ s_0+l_0-n/2,\ 1,2,0}^{\ n/2}, \text{ if } s \geq n/2 \text{ and } s+l \geq n.\quad (4)$$

then $C_{s_0,l_0;\ \chi,\alpha}^{\ n/2}$ and $C_{s_1,l_1;\ \chi,\epsilon}^{\ n/2}$ are merged to $C_{s,\ l;\ \chi,\epsilon}^{\ n/2}$ through n×n merging network 350 of FIG. 5.

Given $0 \leq s < n$, $0 \leq l \leq n$, $0 \leq l_1 \leq l_0 \leq n/2$, and $l=l_0-l_1$, then $s_0=s$ mod $n/2$, $s_1=(s+l)$ mod $n/2$, with the resulting switch settings being $$W_{s_1,l_1;\ 0,3}^{\ n/2}, \text{ if } s+l<n/2;\quad (1)$$

$$W_{s_1,l_1,\ n/2-s_1-l_1;\ 1,3,0}^{\ n/2}, \text{ if } s<n/2 \text{ and } s+l \geq n/2;\quad (2)$$

$$W_{s_1,l_1;\ 1,3}^{\ n/2}, \text{ if } s \geq n/2 \text{ and } s+l<n;\quad (3)$$

$$W_{s_1,l_1;\ s_1+l_1-n/2,\ 0,3,1}^{\ n/2}, \text{ if } s \geq n/2 \text{ and } s+l \geq n.\quad (4)$$

then $C_{s_0,l_0;\ \chi,\epsilon}^{\ n/2}$ and $C_{s_1,l_1;\ \chi,\alpha}^{\ n/2}$ are merged to $C_{s,\ l;\ \chi,\epsilon}^{\ n}$ through n×n merging network 350 of FIG. 5.

Given $0 \leq s < n$, $0 \leq l \leq n$, $0 \leq l_0 \leq l_1 \leq n/2$, and $l=l_1-l_0$, then $s_0=(s+l)$ mod $n/2$, $s_1=s$ mod $n/2$, with the resulting switch settings being $$W_{s_0,l_0;\ 1,3}^{\ n/2}, \text{ if } s+l<n/2;\quad (1)$$

$$W_{s_0,l_0,\ n/2-s_0-l_0;\ 0,3,1}^{\ n/2}, \text{ if } s<n/2 \text{ and } s+l \geq n/2;\quad (2)$$

$$W_{s_0,l_0;\ 0,3}^{\ n/2}, \text{ if } s \geq n/2 \text{ and } s+l<n;\quad (3)$$

$$W_{s_0,l_0;\ s_0+l_0-n/2,\ 1,3,0}^{\ n/2}, \text{ if } s \geq n/2 \text{ and } s+l \geq n.\quad (4)$$

then $C_{s_0,l_0;\ \chi,\epsilon}^{\ n/2}$ and $C_{s_1,l_1;\ \chi,\alpha}^{\ n/2}$ are merged to $C_{s,\ l;\ \chi,\alpha}^{\ n}$ through n×n merging network 350 of FIG. 5.

D. RBN as a Quasi-Sorting Network

This section describes how an RBN can be used as a quasi-sorting network for a multicast assignment. The outputs of scatter network 310 have tag values 0, 1, and $\epsilon$. The output of scatter network 310 is such that the number of 0's and 1's are no more than n/2. As stated above, the n×n quasi-sorting network RBN 320 routes all 0's and 1's on the inputs of the RBN to the upper and lower halves of its outputs respectively, and route $\epsilon$'s to the remaining positions at the outputs. If some $\epsilon$'s are assigned as dummy 0's (denoted as $\epsilon_0$'s), the rest of $\epsilon$'s are dummy 1's (denoted as $\epsilon_1$'s), such that the number of all 0's (including all the real 0's and the dummy 0's) and the number of all 1's (including all the real 1's and the dummy 1's) are equal to n/2, then quasi-sorting is achieved.

E. Self-Routing Procedures

This section describes the distributed self-routing procedures used for setting the switches in each type of RBNs previously described (i.e., bit sorting network, scatter network, and quasi-sorting network). These switch settings are implemented by proper logic circuits or functional modules embedded within nodes of the network 100. Moreover, the procedures are implemented in a pipelined fashion so that circuits used to achieve the switch settings are distributed to each switch module and a lower hardware cost is achieved.

Figure 7:
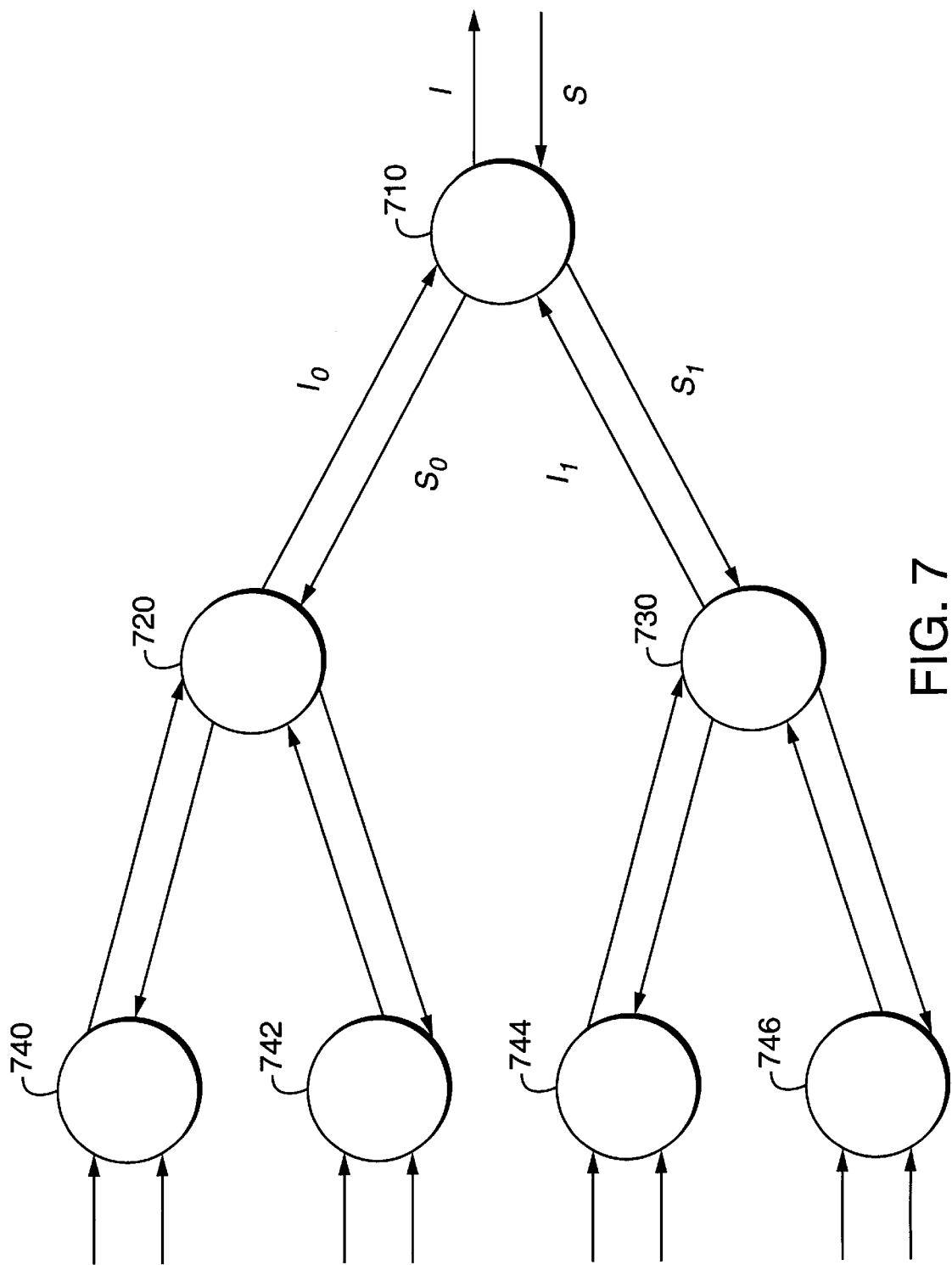
FIG. 7 is a block diagram of a multicast network shown as a binary tree network structure consistent with the present invention.

FIG. 7 is a representative diagram of a binary tree network 700 consistent with the present invention. The following distributed algorithms are performed by each node of a complete binary tree shown. Collectively, the procedures permit the network to configure network 700 to route any multicast input packet to its destination in a single pass. This configuration does not require the multicast input packet to be fed back through the network, as is generally required in most multicasting network environments.

Root node 710 of the tree 700 represents the original RBN as a binary sorting network, a scatter network, or a quasi-sorting network. Two child nodes 720 and 730 of the root node 710 represent the two sub RBN networks 330 and 340 of the original RBN, either 310 or 320. Finally, the leaves 740, 742, 744, and 748 of tree 700 represent switches in the first stage of the original RBN. Those skilled in the art will recognized that FIG. 7 depicts an 8×8 network and larger networks consistent with one embodiment would be represented by further splitting of the nodes. In one embodiment, the switch setting at a node sets all the switches in the last stage of the RBN represented by the node based on the switches known address.

Each distributed self-routing procedure has three phases: 1) a forward phase, in which l is calculated (given $l_0$ and $l_1$) and sent forward to the next stage; 2) a backward phase, in which $s_0$ and $s_1$ are generated (given s, $l_0$, and $l_1$) and are sent backward to the previous stage; and 3) a switch setting phase in which each switch is set simultaneously by using the above values and the switches address in the particular stage. In this instance, l is the total number of inputs having a particular tag value, s is the initial switch setting (i.e., the starting point of the circular compact sequence), b is the final switch setting, $\bar{b}$ is the complement of b (i.e., b=0 or 1). As described above, the switch settings are performed in a circular manner (mod), and div represents an integer division operation.

A self-routing procedure for a bit sorting RBN is as follows:

---

RBN Bit Sorting Pseudo Code

Forward phase:
    forward inputs: $l_0$, $l_1$.
    forward output: l
    function: $\{l \leftarrow l_0 + l_1;\ \}$

```
                RBN Bit Sorting Pseudo Code

Backward phase:
        backward input: s
        backward outputs: s_0, s_1.
        function: {s_0 ← s mod n'/2;
                   s_0 ← (s + l_0) mod n'/2;
        }
    Switch setting phase:
        function: {
            b ← ((s + l_0) div n'/2 mod n'/2
            BinaryCompactSetting(n', 0, s_1, b̄, b)
        }
```

1. Scatter Network

The following is a distributed self-routing procedure for the RBN scatter network consistent with one embodiment. The variable type represents the type of the dominating tag (among α's and ε's in the inputs) of the corresponding sub-RBN network of size n'×n'. In the procedure below, the denotation tmp represents a temporary switch setting for the particular phase. The functions BinaryCompactSetting( ) and TrinaryCompactSetting( ) used are defined from the switch settings performed by the merging procedure of merging network 350 and that provided below. Those skilled in the art will understand that the recursive nature of RBNs allow for the switch settings to be performed at various levels of the network structure and fed back to accomplish switch settings in the forward networks.

```
         RBN Scatter Network Self-Routing Pseudo Code

Forward phase:
    forward inputs: l_0, type_0, l_1, type_1.
    forward output: l, type.
    algorithm: {
        if (type_0 = type_1) {type ← type_0; l ← l_0 + l_1;}
        else if (l_0 > l_1) {type ← type_0; l ← l_0 – l_1;}
        else /* l_0 < l_1 */ {type ← type_1; l ← l_1 – l_0;}
    }
Backward phase:
    backward input: s.
    backward outputs: s_0, s_1.
    function: {
        if (type_0 = type_1) {s_0 ← s mod n'/2;
            s_1 ← (s + l) mod n'/2;}
        else if (l_0 > l_1) {s_0 ← s mod n'/2;
            s_1 ← (s + l_0) mod n'/2;}
        else /* l_0 < l_1 */ {s_0 ← (s + l) mod n'/2;
            s_1 ← s mod n'/2;}
    }
Switch setting phase:
function: {
    if (type_0 = type_1) {b ← ((s + l_0) div n'/2) mod n'/2;
BinaryCompactSetting(n', 0, s_1, b̄, b); return;}
    if (type_0 = α and type_1 = ε) {bcast ← 2;} /* upper broadcast */
    else /* (type_0 = ε and type_1 = α * /
{bcast ← 3;} /* lower broadcast */
    if (l_0 ≥ l_1) (s_tmp ← s_1; l_tmp ← l_1;
ucast ← 0;} /* parallel setting */
    else {/* l_0 < l_1 */s_tmp ← s_0;
l_tmp ← l_0; ucast ← 1;} /* crossing setting */
    case (s + l < n'/2);         BinaryCompactSetting(n', s_tmp,
                                 l_tmp, ucast, bcast);
    case (s < n'/2 and s + l ≥ n'/2);  TrinaryCompactSetting(n', s_tmp,
                                 l_tmp, ūcast, bcast, ucast);
    case (s ≥ n'/2 and s + l < n');  BinaryCompactSetting(n', s_tmp,
                                 l_tmp, ucast, bcast);
    case (s ≥ n'/2 and s + l ≥ n');  TrinaryCompactSetting(n', s_tmp,
                                 l_tmp, ucast, bcast, ūcast);
}
```

2. Perfect Shuffle Output

The following is a compact switch setting procedure for the last stage of an n'×n' RBN representing a perfect shuffle format. In the one embodiment, the last stage is shown in FIG. 5. In the procedure, the denotation tmp represents a temporary switch setting for the particular phase. Further, all switches in one stage are set simultaneously according to the forward and backward values of the n'×n' sub network and its own switch address (r) in modulo (i.e., circular manner) n'/2.

```
              RBN Perfect Shuffle Pseudo Code

BinaryCompactSetting(n', s, l, setting_1, setting_2) {
    for (each switch in the last stage of the RBN) do in parallel {
        let i' be the address of the switch, r_i';
        i ← i' mod n'/2;
        case (s + l < n'/2);
            if(s ≤ i < s + l) {r_i' ← setting_2;}
            else {r_i' ← setting_1;}
        case (s + l ≥ n'/2)
            if (s + l – n'/2 ≤ i < s) {r_i' ← setting_1;}
            else {r_i' ← setting_2;}
        }
    }
TrinaryCompactSetting(n', s, l, setting_1, setting_2, setting_3) {
    for (each switch in the last stage of the RBN) do in parallel {
        let i' be the address of the switch, r_i';
        i ← i' mod n'/2;
        case (0 ≤ i < s;)              r_i' ← setting_1;
        case s ≤ i < s + l;)           r_i' ← setting_2;
        case s + l < n'/2;)            r_i' ← setting_3;
}
```

3. Quasi-sorting

The switch setting procedure for RBN quasi-sorting network 320 first assigns each input with value ε to either a dummy 0 or a dummy 1. Second, the switch setting procedure for the RBN as a bit sorting network (as described above) is called by taking all real 0's and dummy 0's as 0's and all real 1's and dummy 1's as 1's. Next, the ε's tags are divided into dummy 0's (ε_0's) and dummy 1's (ε_1's). A portion of the distributed procedure dividing ε's to ε_0's and ε_1's to the RBN as a quasi-sorting network is provided below. The quasi-sorting RBN uses the bit sorting provided above to complete the routing and switch settings.

```
         Part of the RBN Quasi-sorting Pseudo Code

Forward phase:
    forward inputs: n'_ε, n"_ε.
    forward output: n_ε.
    function: {
        n_ε ← n'_ε + n"_ε; }
Backward phase:
    backward input: n_ε0, n_ε1.
    backward outputs: n'_ε0, n'_ε1, n"_ε0, n"_ε1.
    function: {
        n'_ε0 ← min {n_ε0, n'_ε};
        n'_ε1 ← n'_ε – n'_ε0;
        n"_ε0 ← n_ε0 – n'_ε0;
        n"_ε1 ← n"_ε – n'_ε1;
    }
```

This portion of the RBN quasi-sorting procedure is also performed at each node of the complete binary tree described above, and has a forward phase, and a backward phase. The forward phase computes $n_\epsilon$, the number of ε's in the inputs of this sub-RBN represented by this node given $n'_\epsilon$ and $n''_\epsilon$ (i.e., the numbers of ε's in the inputs of its two sub-RBNs, respectively).

Therefore, $$n_\epsilon = n'_\epsilon + n''_\epsilon. \quad (7)$$

When the forward phase reaches root node 710, the backward phase begins and determines among the number of ε's, how many should be dummy 0's ($\epsilon_0$'s) and how many should be dummy 1's ($\epsilon_1$'s), denoted by $n_{\epsilon^0}$ and $n_{\epsilon^1}$, respectively. This provides, $$n_\epsilon = n_{\epsilon 0} + n_{\epsilon 1} \quad (8)$$

and also $$n_{\epsilon 0} = n'_{\epsilon 0} + n''_{\epsilon 0} \quad (9)$$

$$n_{\epsilon 1} = n'_{\epsilon 1} + n''_{\epsilon 1} \quad (10)$$

where $n'_{\epsilon 0}$ and $n'_{\epsilon 1}$, and $n''_{\epsilon 0}$ and $n''_{\epsilon 1}$ are the numbers of dummy 0's and dummy 1's for the two child nodes. The equations (7), (9) and (10) are invariants for all but leaf nodes and the equation (8) is an invariant for all nodes. To balance the number of 0's and the number of 1's (both "real" and "dummy" ones), initially in the backward phase, $n_{\epsilon^0}$ and $n_{\epsilon^1}$ of the root node is set to $n_{\epsilon^1} = n/2 - n_1$ and $n_{\epsilon^0} = n_\epsilon - n_{\epsilon^1}$, , where $n_1$ represents the number of the "real" 1's of the RBN calculated through the forward phase. Then $n'_{\epsilon 0}$ and $n'_{\epsilon 1}$, and $n''_{\epsilon 0}$ and $n''_{\epsilon 1}$ of the child node is calculated and passed backwards as in the backward phase. The invariants shown in equations (7)–(10) hold at every node. Finally, if the $n_{\epsilon^0}$ of a leaf node is 1, this input is assigned an $\epsilon_0$, and if the $n_{\epsilon^1}$ of the leaf node is 1, this input is assigned an $\epsilon_1$.

F. Conclusion

The different tag values 0, 1, α, and ε (including $\epsilon_0$ and $\epsilon_1$) are used in the both the RBN scatter network and the RBN quasi-sorting network. The three bits $b_0 b_1 b_2$ are used to represent a tag value. Provided below is an encoding scheme for these tag values consistent with one embodiment. To compute the numbers of α's, ε's, and 1's, a combination of the bits of all input tags, as follows, is used.

| Encoding Scheme for Tag values | | | | | | |
|---|---|---|---|---|---|---|
| Tag | 0 | 1 | α | ε | $\epsilon_0$ | $\epsilon_1$ |
| $b_0 b_1 b_2$ | 000 | 001 | 100 | 11X | 110 | 111 |

In this encoding, $b_0 \wedge \overline{b}_1$, where ∧ is a logic AND bit function of an input tag, is used to determine the number of α's in the input (the result is either 0 or 1), and $b_0 \wedge b_1$ for counting the number of ε's in an input in the forward phases of self-routing for the RBN as a scatter network. The calculated dummy (temporary) values are output for dispatching by the RBN quasi-sorting network. Furthermore, since only 0's, 1's, and ε's (including $\epsilon_0$'s and $\epsilon_1$'s) are input tags for the quasi-sorting network RBN, only the bit $b_2$ of an input tag is required for counting all 1's (including "real" and "dummy" 1's) in the forward phase of self-routing for this RBN.

Figure 8:
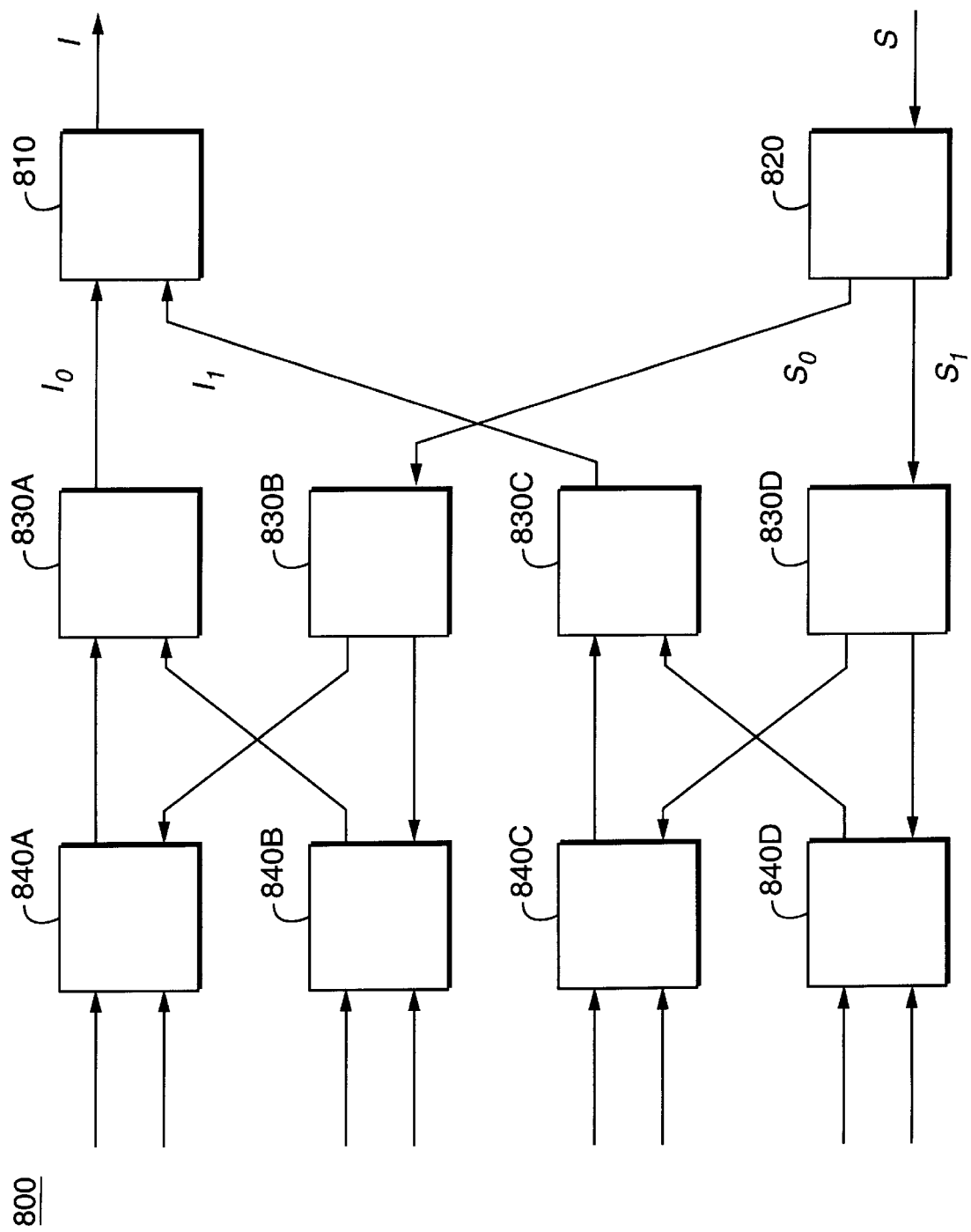
FIG. 8 is a block diagram of an embedded tree network structure for implementing the hardware necessary to establish the multicast network consistent with the present invention.

Secondly, the binary tree structure used in all distributed procedures can be embedded into an RBN. FIG. 8 is a representative diagram showing a balanced hardware distribution 800 for the procedures consistent with one embodiment. Separate the tree is divided into a forward tree, providing output l, and a backward tree, providing input s. In this hardware distribution structure, a first switch 810 and a last switch 820 in the last stage of a sub-RBN network serve as the nodes in the forward tree and the backward tree, respectively. Switches in between 830A–D, 840A–D use the results from these two nodes for their switch settings.

Figure 9:
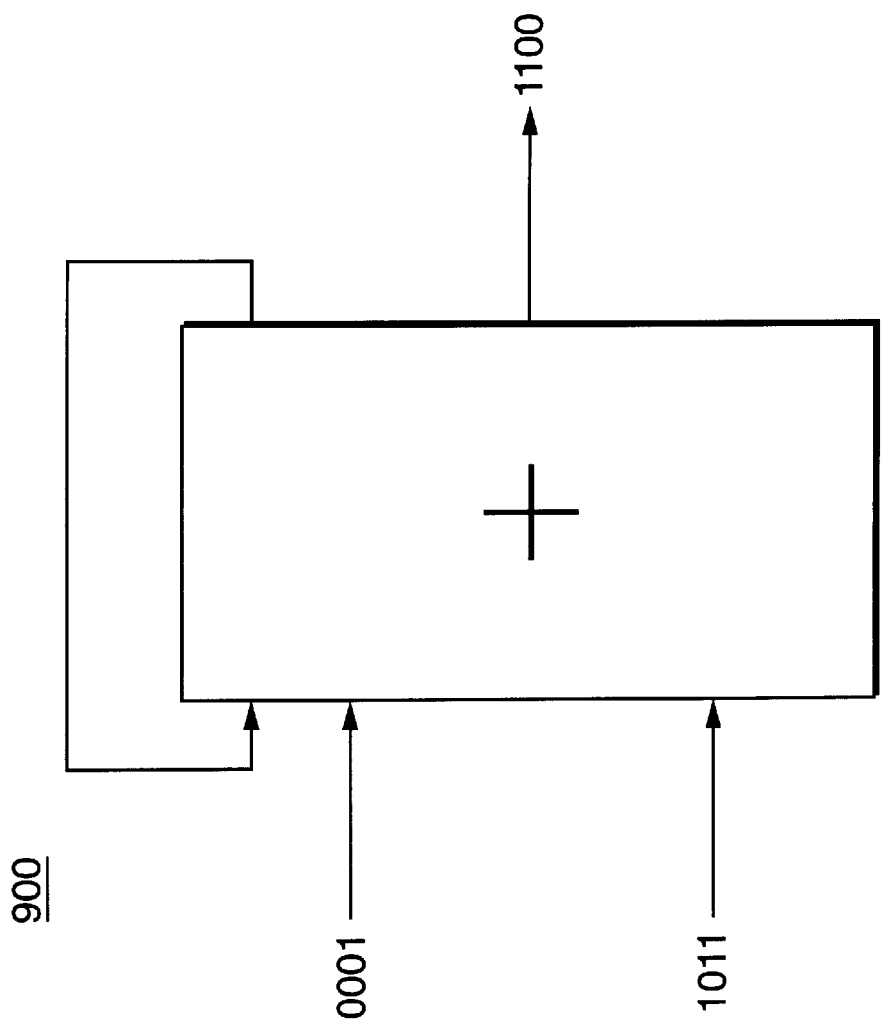
FIG. 9 is a block diagram of a one bit adder for pipeline switch setting distribution consistent with the embedded tree network structure consistent with FIG. 8.

Thirdly, because the most frequently used operation in the distributed procedures is addition (or addition-like operations), in an n×n RBN the maximum values of $n_\alpha$, $n_\epsilon$, or $n_1$ and n, are represented by using at most log n bits. To accomplish these values, a pipeline implementation shown in FIG. 9 is provided. FIG. 9 shows the log n bit adder reduced to a one bit adder 900. Further, since the distributed procedures work in a pipelined fashion, the delay caused by running the forward and backward procedures is significantly reduced over prior solutions.

The hardware cost, network depth, and set-up time of the new multicast network are reduced because there is only a constant cost to each switch for the self-setting circuit and there are n/2 log n switches in an n×n RBN. Therefore, the hardware cost for the RBN is O(n log n), and also for an n×n BSN. If C(n) denotes the cost of an n×n BRSMN, then the recursive construction shown in FIG. 1 provides, C(n)=O(n log n)+2C(n/2), which implies C(n)=O(n log² n).

Further, since the network depth for an n×n RBN is O(log n), it is also so or an n×n BSN. If D(n) denotes the network depth for an n×n BRSMN. From D(n)=O(log n)+D(n/2), it can be determined that D(n)=O(log² n).

Finally, the pipeline type implementation of the distributed switch setting procedures and mechanisms consistent with the present invention requires only O(log n) unit time delay for the first bit (from input) to reach a switch in the last stage of an n×n RBN. Therefore, it takes only O(1) unit time for each of the rest of consecutive log n–1 bits to reach a switch in the last stage. Hence, the propagation delay in both the forward phase and backward phase is O(log n) unit time. By a similar analysis, the total propagation delay of the switch setting procedure for an n×n BRSMN is O(log² n).

Those skilled in the art will recognize that various modifications and variations can be made in the preceding examples without departing from the scope or spirit of the invention. For example, since all major functional components are recursively defined RBNs, part of the network can be reused to reduce cost. Thus, a feedback version consistent with the present invention can further reduce the network cost to O(n log n).

The specification does not limit the invention. Instead it provides examples and explanations to allow persons of ordinary skill to appreciate different ways to practice this invention. The following claims define the true scope and spirit of the invention.

What is claimed is:

1. A self routing multicast network architecture comprising:
   a first sub-network receiving multicast inputs each having a destination set and configured to divide the destination set into an upper output subset and a lower output subset, wherein the first sub-network is a binary splitting network (BSN); and
   a second sub-network, coupled to the first sub-network, configured to route the upper output subset and lower output subset, wherein the second sub-network includes
      an upper binary radix sorting multicast network (BRSMN) coupled to an upper half of the first sub-network and configured to receive the upper output subset, and
      a lower BRSMN coupled to a lower half of the first sub-network and configured to receive the lower output subset.

2. The network architecture of claim 1, wherein each member in the destination set are represented by an input tag, and wherein the first sub-network includes:

scattering means configured to route the members identified by an $\alpha$ tag to either an upper output destination subset or a lower output destination subset, wherein the $\alpha$ tag represents a destination set having at least one destination in the upper subset of the destination output; and quasi-sorting means, coupled to the scattering means, including means for routing the upper output destination subset to the upper half of the first sub-network, and means for routing the lower output destination subset to the lower half of the first sub-network.

3. The network architecture of claim 2, wherein the scattering means comprises a recursive reverse banyan network (RBN) having n inputs and includes a first n/2×n/2 RBN;

a second n/2×n/2 RBN; and means, coupled to the first RBN and the second RBN, for merging outputs of the first RBN and second RBN in a perfect shuffle format.

4. The network architecture of claim 3, wherein the quasi-sorting means comprises a recursive RBN and includes a first n/2×n/2 RBN configured to route the members identified by a zero (0) input tag to the upper output destination subset;

a second n/2×n/2 RBN configured to route the members identified by a one (1) input tag to the lower output destination subset;

means for distributing the members having an $\epsilon$ input tag such that the upper output destination subset and the lower output destination subset each have n/2 members, wherein the $\epsilon$ tag represents a destination set consisting of an empty set; and means coupled to the first RBN and the second RBN, for merging outputs of the first RBN and second RBN in a perfect shuffle format.

5. The network architecture of claim 4, wherein the means for merging includes a plurality of 2×2 switches each coupled to an output destination.

6. The network architecture of claim 5, further including a self-routing mechanism for configuring the network to allow single pass routing of the multicast input, the self-routing mechanism including means for determining a number of input tag occurrences for each tag value in the multicast input;

means for determining an initial switch setting of a plurality of switches residing in network in accordance with the determined number of input tag occurrences; and means for setting a switch position of at least one switch in the plurality of switches in accordance with the initial switch setting.

7. The network architecture of claim 6, wherein the scattering means further includes a scattering self-routing mechanism including means for determining a number of input tag occurrences for each input to the scattering means;

means for determining an initial switch setting of a plurality of switches residing in scattering means in accordance with the determined number of input tag occurrences; and means for setting a switch position for at least one of the switches residing in the scattering means in accordance with the initial switch setting.

8. The network architecture of claim 7, wherein the quasi-sorting means further includes a quasi-sorting self-routing mechanism including means for determining a number of input tag occurrences for each input to the quasi-sorting means;

means for determining an initial switch setting of a plurality of switches residing in quasi-sorting means in accordance with the determined number of input tag occurrences; and means for setting a switch position for at least one of the switches residing in the quasi-sorting means in accordance with the initial switch setting.

9. A method, in a self-routing multicast network receiving multicast inputs each having a destination set that includes a plurality of members, for routing the multicast input through the multicast network in a single pass comprising the steps of:

assigning an input tag to each member of the destination set, wherein the input tag is assigned based on a binary value of the member;

counting a number of input tag occurrences in the destination set;

determining an initial switch setting for at least one of a set of switches in a first sub-network in accordance with the number of input tag occurrences;

setting a switch position of the at least one switch in the first sub-network in accordance with the initial switch setting;

separating the destination set into a lower output subset and an upper output subset in accordance with the set switch position;

determining a number of tag value occurrences for each member of the lower output subset and the upper output subset;

determining an initial switch setting for at least one of a set of switches in the second sub-network in accordance with the determined number of tag value occurrences within the lower output subset and the upper output subset; and setting a switch position of the at least one switch in the second sub-network in accordance with the initial switch setting.

10. The method of claim 9, wherein the step of counting includes the substeps of:

identifying the members in the destination set having an $\alpha$ input tag, wherein the $\alpha$ tag represents a destination set having at least one destination in the upper subset of the destination output; and counting the number of $\alpha$ input tags identified.

11. The method of claim 10, wherein the step of determining the initial switch setting includes the substep of:

determining the initial switch setting based on a total number of $\alpha$ tag values in the destination set.

12. The method of claim 11, wherein the first sub-network comprises a scattering network having a set of switches, and wherein the step of setting the switch position in the first sub-network comprises the substeps of:

setting at least one of the set of switches residing in the scattering network to split the $\alpha$ identified members between the upper output subset and the lower output subset;

routing the upper output subset to an upper half of the scattering network, and routing the lower output subset to a lower half of the scattering network.

13. The method of claim 12, wherein the second sub-network comprises a quasi-sorting network, and wherein the step of determining the number of tag value occurrences for each member of the lower output subset and the upper output subset comprises the substeps of:

receiving the lower output subset at a lower half of the quasi-sorting network;

receiving the upper output subset at an upper half of the quasi-sorting network;

identifying the members in the lower output subset and the upper output subset having an $\epsilon$ input tag, wherein the $\epsilon$ tag represents a destination set consisting of an empty set; and counting the number of $\epsilon$ input tags identified.

14. The method of claim 13, wherein the step of determining the initial switch setting includes the substep of:

determining the initial switch setting in accordance with the number of $\epsilon$ input tags in the upper output subset and lower output subset.

15. The method of claim 14, wherein the lower half and the upper half of the quasi-sorting network include a first reverse banyan network (RBN) and a second RBN, respectively, and wherein the step of setting the switches in the second-sub-network includes the substeps of:

setting at least one of the set of switches in the quasi-sorting network to route the members in the received upper output subset and the lower output subset having a zero (0) input tag to the first RBN;

setting at least one of the set of switches in the quasi-sorting network to route the members in the received lower output subset and the upper output subset having a zero (1) input tag to the second RBN; and setting at least one of the set of switches in the quasi-sorting network to distribute the members of the lower output subset and the upper output subset identified by the $\epsilon$ input tag equally between the first RBN and the second RBN.

16. The method of claim 15, wherein the upper RBN and the lower RBN are coupled to a merging network, and wherein the method further includes the step of merging outputs of the first RBN and second RBN in a perfect shuffle format.

17. The method of claim 16, wherein the scattering network includes a first n/2 RBN and a second n/2 RBN, wherein n is a number of multicast inputs received by the first sub-network.

18. The method of claim 17, further including the step of routing the merged outputs to the input of the first sub-network.

19. A method of designing a self-routing multicast network architecture comprising the steps of:

providing a first sub-network for receiving multicast inputs each having a destination set, wherein the first sub-network is a binary splitting network (BSN);

configuring the first sub-network to separate the destination set into an upper output subset and a lower output subset; and providing a second sub-network, coupled to the first sub-network, to route the upper output subset and lower output subset, providing, within the second sub-network, an upper binary radix sorting multicast network (BRSMN), coupled to an upper half of the first sub-network, to receive the upper output subset;

providing within the second sub-network, a lower BRSMN coupled to a lower half of the first sub-network, to receive the lower output subset.

20. The method of claim 19, wherein each member in the destination set is represented by an input tag, and wherein the first sub-network is a binary splitting network (BSN) and wherein the step of providing the first sub-network includes the substeps of:

configuring a scattering network, within the BSN, to route the members identified by an $\alpha$ tag to either an upper output destination subset or a lower output destination subset, wherein the $\alpha$ tag represents a destination set including at least one destination in the upper subset of the destination output; and configuring a quasi-sorting network, within the BSN and coupled to the scattering network, to route the upper output destination subset to the upper half of the first sub-network, and to route the lower output destination subset to the lower half of the first sub-network.

21. The method of claim 20, wherein the step of configuring the quasi-sorting network includes the substeps of:

configuring a first n/2×n/2 reverse banyan network (RBN), within the quasi-sorting network, to route the members identified by a zero (0) input tag to the upper output destination subset, wherein n is a number of multicast inputs;

configuring a second n/2×n/2 RBN, within the quasi-sorting network, to route the members identified by a one (1) input tag to the lower output destination subset;

distributing the members having an $\epsilon$ input tag such that the upper output destination subset and the lower output destination subset each have n/2 members, wherein an $\epsilon$ tag represents a destination set consisting of an empty set; and merging outputs from the first RBN and second RBN in a perfect shuffle format.

22. The method of claim 21, further including the steps of:

providing a self-routing mechanism to allow single pass routing of the multicast input.

23. The method of claim 22, wherein the step of providing the self-routing mechanism includes the substeps of:

determining a number of input tag occurrences for each tag value in the multicast input;

determining an initial switch setting of at least one of a set of switches residing in network in accordance with the determined number of input tag occurrences; and setting a switch position of the at least one switch in accordance with the initial switch setting.

* * * * *